(12) United States Patent
Nishida et al.

(10) Patent No.: US 8,082,077 B2
(45) Date of Patent: Dec. 20, 2011

(54) STEERABLE VEHICLE INFORMATION DISPLAY SYSTEM, AS WELL AS COCKPIT MODULE AND STEERABLE VEHICLE INCORPORATING THE SYSTEM

(75) Inventors: Osamu Nishida, Taki-gun (JP); Fumiaki Fujimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 955 days.

(21) Appl. No.: 12/066,140

(22) PCT Filed: Aug. 21, 2006

(86) PCT No.: PCT/JP2006/316297
§ 371 (c)(1),
(2), (4) Date: Mar. 7, 2008

(87) PCT Pub. No.: WO2007/029475
PCT Pub. Date: Mar. 15, 2007

(65) Prior Publication Data
US 2009/0157254 A1 Jun. 18, 2009

(30) Foreign Application Priority Data
Sep. 9, 2005 (JP) ................................ 2005-262796

(51) Int. Cl.
*B60R 16/02* (2006.01)
*G06F 7/00* (2006.01)
(52) U.S. Cl. .......................................... 701/36; 701/35
(58) Field of Classification Search .................... 701/41, 701/1, 35–36; 340/425.5, 901, 500, 458–459, 340/461
See application file for complete search history.

(56) References Cited

U.S. PATENT DOCUMENTS 6,093,977 A * 7/2000 Fujita et al. .................. 307/10.1
6,169,944 B1 1/2001 Hayasaka
6,882,917 B2 * 4/2005 Pillar et al. ...................... 701/48
(Continued)

FOREIGN PATENT DOCUMENTS
JP 03-103718 A 4/1991
(Continued)

OTHER PUBLICATIONS

Official communication issued in counterpart International Application No. PCT/JP2006/316297, mailed on Oct. 3, 2006.

*Primary Examiner* — Yonel Beaulieu
(74) *Attorney, Agent, or Firm* — Keating & Bennett, LLP (57) ABSTRACT

A steerable vehicle information display system is provided, in which images remain undisturbed even if a momentary power interruption occurs. The steerable vehicle information display system comprises: a DPF controller (21), which acquires status information ($D_1$ to $D_4$) from the ECUs of each section of a motor vehicle with a predetermined periodicity; a rendering controller (22), which generates component images representative of the status of each section of the motor vehicle based on the status information ($D_1$ to $D_4$) and generates a composite image of a motor vehicle dashboard by compositing the generated component images; and a nonvolatile memory (24), which stores the status information ($D_1$ to $D_4$) or intermediate information generated from the status information, with the information being at least the latest information. If any of the status information ($D_1$ to $D_4$) is not acquired, the rendering controller (22) generates the informational image using information read from the nonvolatile memory (24) and displays it on the liquid crystal display device (11).

6 Claims, 7 Drawing Sheets

U.S. PATENT DOCUMENTS

2007/0063824 A1 * 3/2007 Gaddy et al. ............. 340/426.21

FOREIGN PATENT DOCUMENTS

| | | |
|---|---|---|
| JP | 11-53207 A | 2/1999 |
| JP | 11-53270 A | 2/1999 |
| JP | 11-161248 A | 6/1999 |
| JP | 11-161557 A | 6/1999 |
| JP | 2002-32071 A | 1/2002 |
| JP | 2002-350192 A | 12/2002 |

* cited by examiner

| $D_1$ (Km/h) | $D_2$ (rpm) | $D_3$ | $D_4$ | MEN |
|---|---|---|---|---|
| 60~100 | 1500~2500 | D | N | 001 |
| 60~100 | 1500~2500 | D | L | 001 |
| 60~100 | 1500~2500 | D | R | 001 |
| 100~150 | 1500~2500 | D | N | 002 |
| | | | | |

STEERABLE VEHICLE INFORMATION DISPLAY SYSTEM, AS WELL AS COCKPIT MODULE AND STEERABLE VEHICLE INCORPORATING THE SYSTEM

TECHNICAL FIELD

The present invention relates to an information display system for a steerable vehicle utilizing a dot-matrix type image display device to present a driver with an informational image required for steering the steerable vehicle and the like, as well as to a cockpit module and a steerable vehicle incorporating this system.

BACKGROUND ART the past, meters of the analog or counting type, as well as indicator lamps, such as, for instance, light bulbs and LEDs, etc., have been often used on the dashboards of motor vehicles and the like. In addition, segmented liquid crystal displays have also been commonly used for numeric digital displays and indicator displays.

It should be noted that, in recent years, liquid crystal panel display devices and other dot-matrix type image display devices have come to be used for the dashboards of motor vehicles, etc. Specifically, at least a portion of a dashboard is formed as a dot-matrix type image display device capable of displaying arbitrary patterns, with images of various indicators and meters, such as a speedometer, etc. displayed thereon.

In this manner, the use of dot-matrix type image display devices on the dashboards of motor vehicles, etc. allows for imparting a variety of patterns to dashboard displays. For example, the types of the displayed meters and indicators, as well as their arrangement and dimensions, can be dynamically changed as needed. Furthermore, images other than the dashboard image, such as, for instance, scenery from outside the vehicle captured by CCD (charged coupling device) imaging devices or images used for navigation, etc. can be composited and displayed together with images of meters.

Thus, in a conventional steerable vehicle information display system utilizing a dot-matrix type image display device, an ECU (electronic control unit) used for image generation collects information transmitted from multiple ECUs provided in various locations onboard a motor vehicle etc. (e.g. information indicating the opened/closed status of the doors, the speed of travel of the motor vehicle, etc.). Multiple images representing the status of the various sections of the motor vehicle, such as, for instance, images of a speedometer, a tachometer, a gear indicator, a coolant temperature gauge, or a fuel level gauge, etc., are then created in the image-generating ECU. The image-generating ECU then composites the multiple created images and forwards them to the image display device, directing it to display the composite image. This makes it possible to display a composite image of the dashboard of the motor vehicle etc.

Incidentally, the problem with conventional steerable vehicle information display systems is that they suffer from display disturbances caused by momentary power interruptions, during which there occurs an instant drop in the battery voltage of the motor vehicle etc.

In other words, the image-generating ECU of the above-described conventional steerable vehicle information display system receives information representative of the status of each section of the motor vehicle from the processors of the ECUs provided in each section. That is to say, information on the RPM of the engine, traveling speed, gear position, etc. is transmitted to the image-generating ECU from the processor of the ECU that governs the drive system, including the engine and the powertrain. In addition, information regarding the illumination status of the lights, the opened/closed status of the doors, the presence or absence of airbag malfunctions, the fastened/unfastened status of the seat belts, etc. is transmitted from the processor of the ECU that governs the safety system used to enhance the safety of the motor vehicle. Furthermore, information on cabin temperature and air conditioner air outlet temperature is transmitted from the processor of the ECU that governs the amenity system used to enhance comfort inside the vehicle.

In the conventional steerable vehicle information display system, the image-generating ECU utilizes the respective information of multiple types transmitted by the multiple ECUs to generate images of predetermined patterns that make it easier for the driver to intuitively recognize the status of the various systems mentioned above. For instance, an image representing a conventional analog type speedometer, or an image displaying the speed as a numeric value is generated in order to represent the speed of travel. Moreover, an image showing that a door is open is generated if a door is not snugly closed. In addition, images are generated that represent various indicators, for instance, such as a gear position indicator, a fuel level gauge, a radiator coolant temperature gauge, etc. Images generated in this manner based on the various types of information are then superimposed to generate a single image representing the entire motor vehicle dashboard, which is displayed on the display device.

In such a conventional construction, some of the multiple ECUs provided in the various sections of the motor vehicle may sometimes be instantly halted if there is a momentary power interruption due to a battery voltage drop. Because in such cases no information is sent from the halted ECUs to the image-generating ECU, the image-generating ECU cannot create the images of the sections corresponding to the halted processors. As a result, at least some of the images supposed to be displayed as components of the motor vehicle dashboard are no longer displayed. For example, if the ECU that governs sensors detecting the traveling speed of the motor vehicle is halted, the image of the speedometer etc. instantly vanishes from the display.

JP H11-53270A is noted to have disclosed a technology for controlling the operation of onboard electrical devices during a momentary power interruption. According to the invention disclosed in JP H11-53270A, in case of a battery voltage drop, a determination is made as to whether this is a momentary power interruption and the operating conditions of the onboard electrical devices at the time of resumption of operation are set depending on whether this was indeed a momentary power interruption.

DISCLOSURE OF INVENTION

With account taken of the above-described problems, it is an object of the present invention to provide a steerable vehicle information display system in which images remain undisturbed even in case of a momentary power interruption, as well as a cockpit module and a steerable vehicle incorporating the same.

In order to achieve the above-mentioned object, the steerable vehicle information display system according to the present invention is a steerable vehicle information display system presenting a driver of a steerable vehicle with an informational image representative of the status of the steerable vehicle, comprising: a status information acquisition unit that acquires status information indicative of the status of each section of the steerable vehicle respectively from each section with a predetermined periodicity; an image-generating unit that generates component images respectively representative of the status of each section of the steerable vehicle based on the status information acquired by the status information acquisition unit and generates the informational image by compositing the generated component images; a dot-matrix type display device for displaying the informational image generated by the image-generating unit; and a storage unit that stores information, which in the status information or intermediate information generated from the status information used to generate the informational images in the image-generating unit, and which is at least the latest information, wherein whenever any part of the status information supposed to be acquired in the status information acquisition unit is not acquired, the image-generating unit generates the informational image using the status information or intermediate information stored in the storage unit and displays it on the display device.

Furthermore, in the cockpit module according to the present invention, the steerable vehicle information display system of the present invention is incorporated into an instrument panel.

The steerable vehicle according to the present invention is a steerable vehicle, comprising: a status information output unit that detects the status of each section of the steerable vehicle at each section and outputs status information representative of the detection results; and a steerable vehicle information display system which, based on the status information, generates, and presents a driver with, an informational image representative of the status of the steerable vehicle, wherein the steerable vehicle information display system comprises: a status information acquisition unit that acquires respective status information indicative of the status of each section from the status information output unit with a predetermined periodicity; an image-generating unit that generates component images respectively representative of the status of each section of the steerable vehicle based on the status information acquired by the status information acquisition unit and generates an informational image by compositing the generated component images; a dot-matrix type display device for displaying the informational image generated by the image-generating unit; and a storage unit that stores information, which is the status information or intermediate information generated from the status information used to generate the informational image in the image-generating unit, and which is at least the latest information, and whenever any part of the status information supposed to be acquired in the status information acquisition unit is not acquired, the image-generating unit generates the informational image using the status information or intermediate information stored in the storage unit and displays it on the display device.

According to the present invention, a steerable vehicle information display system can be provided, in which images remain undisturbed even in case of momentary power interruptions, as well as a cockpit module and a steerable vehicle incorporating the same.

BRIEF DESCRIPTION OF DRAWINGS

FIG. 3(*a*) is an explanatory diagram illustrating an exemplary composite informational image.

FIG. 3(*b*) is an explanatory diagram illustrating fixed component images in the informational image of FIG. 3(*a*).

FIG. 3(*c*) is an explanatory diagram illustrating variable component images in the informational image of FIG. 3(*a*)

DESCRIPTION OF THE INVENTION

In order to achieve the above-mentioned object, the steerable vehicle information display system according to the present invention is a steerable vehicle information display system presenting a driver of a steerable vehicle with an informational image representative of the status of the steerable vehicle, comprising: a status information acquisition unit that acquires status information indicative of the status of each section of the steerable vehicle respectively from each section with a predetermined periodicity; an image-generating unit that generates component images respectively representative of the status of each section of the steerable vehicle based on the status information acquired by the status information acquisition unit and generates the informational image by compositing the generated component images; a dot-matrix type display device for displaying the informational image generated by the image-generating unit; and a storage unit that stores information, which is the status information or intermediate information generated from the status information used to generate the informational images in the image-generating unit, and which is at least the latest information, wherein whenever any part of the status information supposed to be acquired in the status information acquisition unit is not acquired, the image-generating unit generates the informational image using the status information or intermediate information stored in the storage unit and displays it on the display device.

In accordance with this configuration, if any part of the status information indicative of the status of each section cannot be acquired due to a momentary power interruption caused by a drop in the battery voltage of the steerable vehicle, the image-generating unit utilizes the status information or intermediate information stored in the storage unit in order to generate the informational image and displays it on the display device. This prevents the informational image from being disturbed or interrupted even if a momentary power interruption occurs. It should be noted that the term "intermediate information" mentioned above refers to information generated based on the status information at the time of informational image generation and used in an intermediate manner in the process of informational image generation.

In the steerable vehicle information display system described above, it is preferable that the component images comprise both fixed component images, which represent those portions of the informational image which exhibit a relatively small amount of change over time, and variable component images, which represent those portions which exhibit a relatively large amount of change over time, the image-generating unit generates the fixed component images and variable component images individually based on the status information, and when it is determined that there are no changes in the fixed component images based on the status information or intermediate information, the image-generating unit generates the informational image by updating only the variable component images.

The reason for this lies in the fact that the time required for the generation of the informational image can be shortened by generating the informational image based on updating only the variable component images if it is determined that there are no changes in the fixed component images.

Furthermore, in the preferred construction described above, it is preferable that the storage unit stores the status information or intermediate information used for generating the fixed component images along with the status information or intermediate information used for generating the variable component images, and when it is determined that there are no changes in the status information or intermediate information used for generating the fixed component images, only the status information or intermediate information used for generating the variable component images is updated and stored in the storage unit.

This makes it possible to shorten the tune required to store the status information or intermediate information in the storage unit.

In the steerable vehicle information display system described above, it is preferable that the display device comprises a liquid crystal panel.

Embodiments of the present invention, as applied to motor vehicles (passenger vehicles), are described specifically below with reference to drawings. It should be noted that the scope of the present invention is not limited solely to motor vehicles. In addition to motor vehicles, the present invention can be applied to various conveyances (moving means or conveying means) such as motor bicycles, motor tricycles, special-purpose vehicles, railroad cars and other road vehicles, amphibious vehicles, aircraft or watercraft, etc. Furthermore, the present invention is not limited to the above-described conveyances intended primarily for moving or conveying, and is also applicable to construction machinery and other steerable equipment. In the present application, the above-described conveyances and steerable equipment are collectively referred to as "steerable vehicles".

Figure 2:
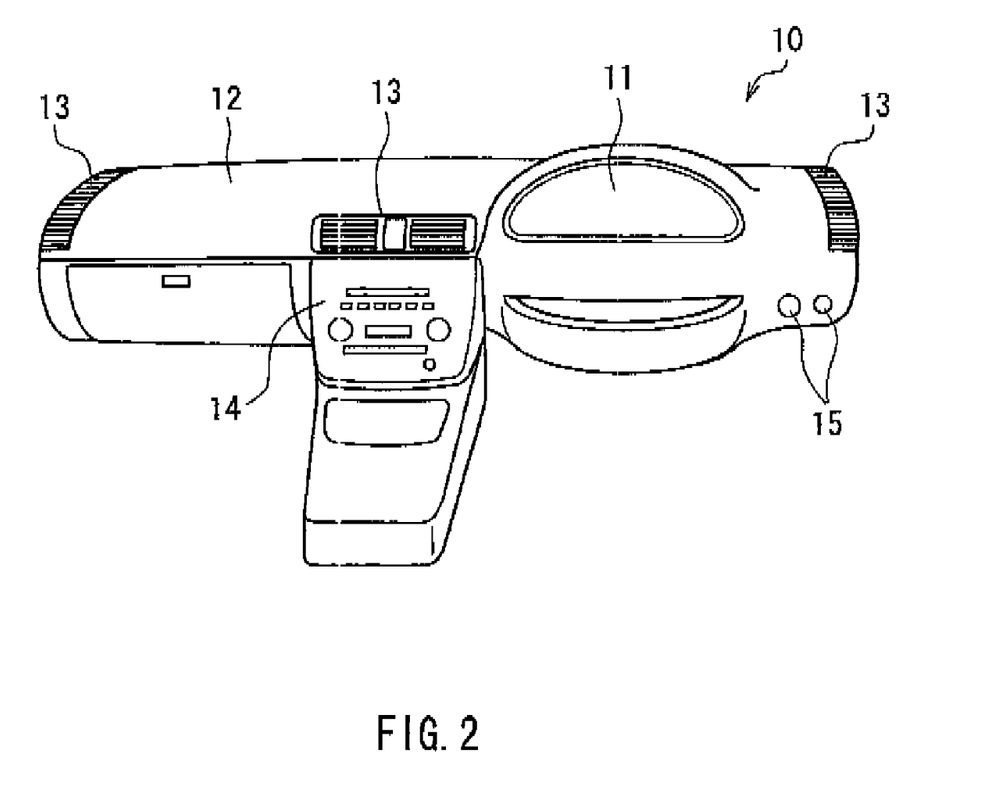
FIG. 2 is a front elevational view illustrating the external appearance of an automobile cockpit module (cockpit module) provided with a built-in steerable vehicle information display system according to an embodiment of the present invention.

FIG. 2 is a front elevational view illustrating the external appearance of a motor vehicle cockpit module (cockpit module) equipped with a built-in steerable vehicle information display system according to the present embodiment. As shown m FIG. 2, instead of a conventional motor vehicle dashboard comprising indicator lamps employing LEDs and conventional analog meters, such as a speedometer or tachometer, a motor vehicle cockpit module 10 according to the present embodiment comprises a liquid crystal display device 11 displaying a composite image of a motor vehicle dashboard.

It should be noted that the liquid crystal display device 11 is not a conventional segmented liquid crystal display often used in motor vehicles, but rather a dot-matrix type liquid crystal panel-based display device. Due to its ability to display images of arbitrary patterns, the liquid crystal display device 11 can operate as a motor vehicle dashboard by displaying a composite image produced by combining various component images of various instruments and indicator lamps, etc.

The liquid crystal display device 11 is attached to an instrument panel 12, which forms part of the frame of the cockpit module 10, such that it is positioned behind a steering wheel (not shown). In addition to the liquid crystal display device 11, the cockpit module 10 comprises an air-conditioning unit (not shown), an air conditioning duct 33, which guides air from the air-conditioning unit into the interior of the motor vehicle, an audio module 14, lamp switches 15, a steering mechanism (not shown), an airbag module (not shown), etc.

It should be noted that the cockpit module configuration illustrated in FIG. 2 is merely an example and the embodiments of the present invention are not limited thereto. For instance, although in the example of FIG. 2 the liquid crystal display device 11 is arranged directly opposite the driver, the invention is not limited to such an arrangement and may use a construction, in which the liquid crystal display device 11 is arranged in the central portion of the instrument panel, i.e. between the driver's seat and the passenger's seat.

Figure 1:
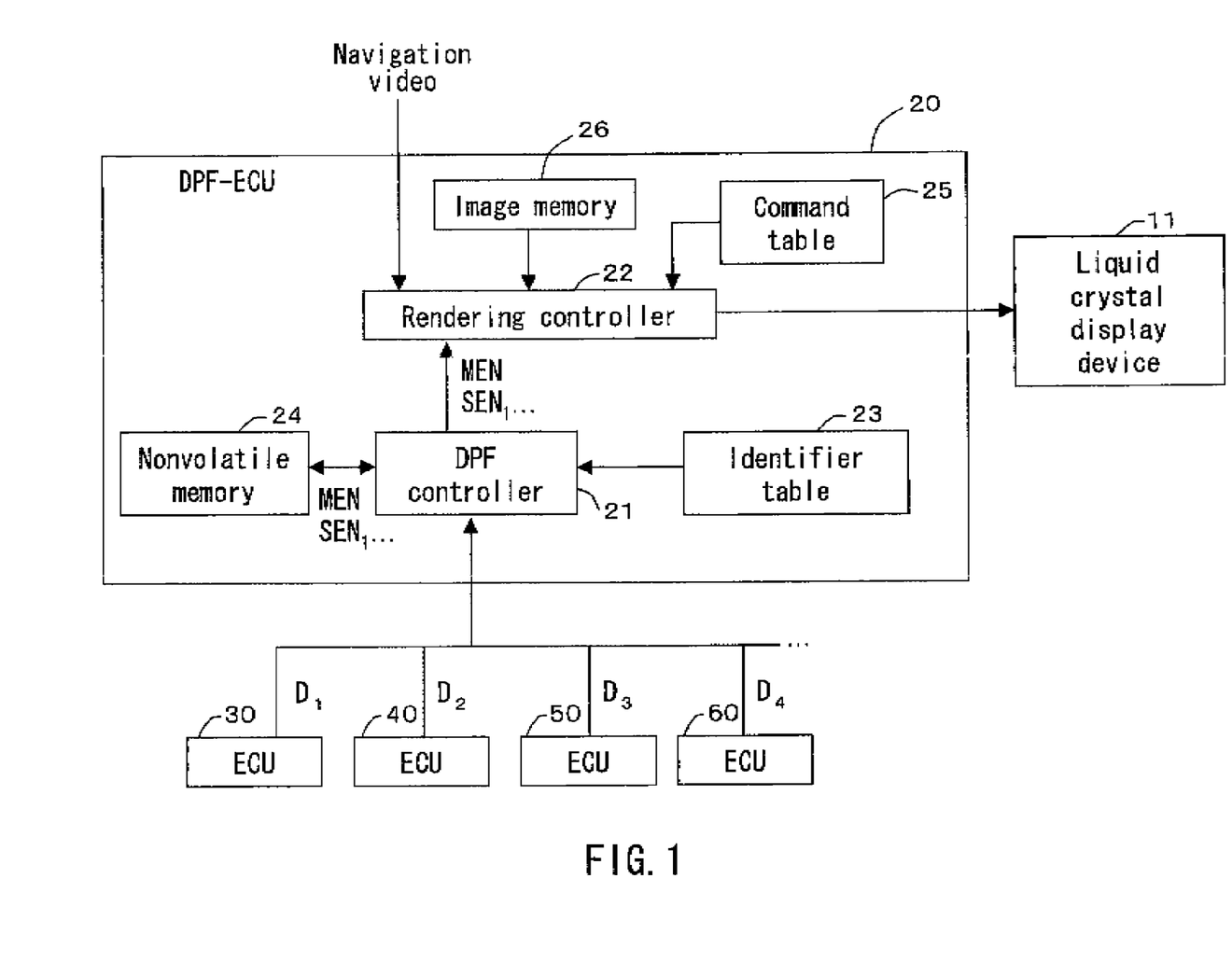
FIG. 1 is a block diagram illustrating the functional configuration of the steerable vehicle information display system according to the present embodiment.

FIG. 1 is a block diagram illustrating the functional configuration of the steerable vehicle information display system according to the present embodiment. The display of the liquid crystal display device 11 is controlled by a DPF (display platform)-ECU 20, which is illustrated in FIG. 1. The DPF-ECU 20 comprises a DPF controller 21, a rendering controller 22, an identifier table 23, a nonvolatile memory 24, a command table 25, and an image memory 26.

The DPF-ECU 20 acquires information (status information) $D_1$ to $D_4$ describing the status of the various sections of the motor vehicle from the ECUs 30, 40, 50, and 60 provided in the various sections of the motor vehicle with a predetermined periodicity. It should be noted that such "predetermined periodicity" can be set to be of any length. Based on the acquired status information, the DPF-ECU 20 generates a composite image of a motor vehicle dashboard used to present a driver with the current status of the motor vehicle in an easily comprehensible form. The generated image is sent from the DPP-ECU 20 to the liquid crystal display device 11 for display.

Although as described above, the term "status information" refers to information representative of the status of the various sections of the motor vehicle, in addition to the information related to the status of mechanical operation of the various sections of the motor vehicle (e.g. the speed of travel, RPM, etc.), it can contain information of other types, such as status information (e.g. remaining fuel level, cabin temperature, etc.) not directly related to the mechanical operation of the various sections.

Although examples, in which status information is collected from four ECUs 30, 40, 50, and 60, are described in connection with FIG. 1 and below for simplicity of discussion, it should be noted that the number of the ECUs subject to status information collection is not limited to four and may be either greater or smaller than that. The information being collected, which in this example actually refers to a passenger car, includes, for instance, the RPM of the engine, travelling speed, gear position, operational status of the direction indicators, illumination status of the lights, opened/closed status of the doors and trunk, door lock status, tire status, presence or absence of airbag malfunctions, fastened/unfastened status of the seat belts, air conditioner air outlet temperature, cabin temperature, ambient atmospheric temperature, audio equipment status, configuration status of the self-steering function, operational status of the wipers, remaining fuel level, remaining battery capacity, power meter (in case of a hybrid vehicle), remaining oil level, radiator temperature, engine temperature, etc.

The DPF controller 21 is a microcomputer exercising overall control over the operation of the DPF-ECU 20. Moreover, the DPF controller 21 refers to the identifier table 23 with the status information $D_1$ to $D_4$ as the key to generate identifiers (intermediate information) that specify what kind of images are to be generated and sends them to the rendering controller 22.

Based on the identifiers provided by the DPF controller 21, the rendering controller 22 refers to the image memory 26 and command table 25 and generates images to be displayed on the liquid crystal display device 11. Moreover, the DPF-ECU 20 can also accept video such as navigation images as input from a hard drive provided onboard the steerable vehicle or from another storage device (not shown). If necessary, the rendering controller 22 can incorporate video into the composite image.

The identifier table 23 is a table used to determine identifiers according to combinations of the status information received from the ECUs 30, 40, . . . etc. Detailed explanations regarding the identifiers are provided below. In the present embodiment, a main event number (MEN: main event numbers) and sub-event numbers (SENs: sub event numbers) are used as the identifiers. The MEN is an identifier that identifies the layout of the image to be displayed on the liquid crystal display device 11. On the other hand, the SENs are identifiers that identify the way individual component images are displayed in a layout identified by the MEN. The values of the MEN and SENs are defined in the identifier table 23 depending on various values assumed by the status information D, Whenever the DFP controller 21 acquires the status information D, it compares the acquired status information D with the identifier table 23 in order to determine the values of the MEN and SENs corresponding to the status information D and outputs them to the rendering controller 22.

Each of the respective layouts identified by the MEN defines what images are to be displayed in what parts of the display screen of the liquid crystal display device 11. In the motor vehicle information display system of the present embodiment, appropriate information display matching the current status of the motor vehicle is implemented by defining different MEN values for various situations assessed based on the contents of the status information D.

For instance, when the motor vehicle is m motion, the display of the speedometer and tachometer is required, but when the engine is stopped and the vehicle is parked, the display of those meters is not required, and it is often the navigation images that are necessary. Accordingly, a layout displaying meters such as a speedometer or tachometer is used in the former case, while in the latter case it is desirable to use a layout that does not display meters and reserves large areas for displaying navigation images and the like. Moreover, in ease of a vehicle provided with cameras capable of capturing scenery outside the vehicle, e.g. behind and on both sides of the motor vehicle, it is preferable to use a layout comprising areas for displaying images captured by these cameras during back-end or parallel parking. Accordingly, the motor vehicle information display system of the present embodiment provides a driver with necessary information in clearly visible form by determining the current status of the motor vehicle from the status information D and displaying the information on the liquid crystal display device 11 using a layout suitable for the current status of the motor vehicle.

Figure 3A:
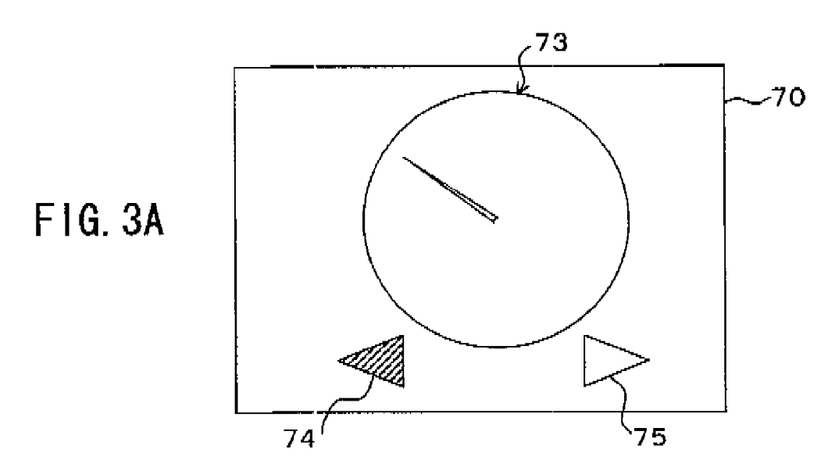

For instance, it is assumed that a composite image 70 of a motor vehicle dashboard, such as the one illustrated in FIG. 3(a), is displayed on the liquid crystal display device 11. It should be noted that while an extremely simplified motor vehicle dashboard is employed in this example, the design of the motor vehicle dashboard displayed on the liquid crystal display device 11 can be selected at will. The composite image 70 illustrated in FIG. 3(a) is formed by a combination of a component image 73 representing a speedometer and a pair of component images 74 and 75 representing the indicator lamps of a direction indicator.

Figure 3B:
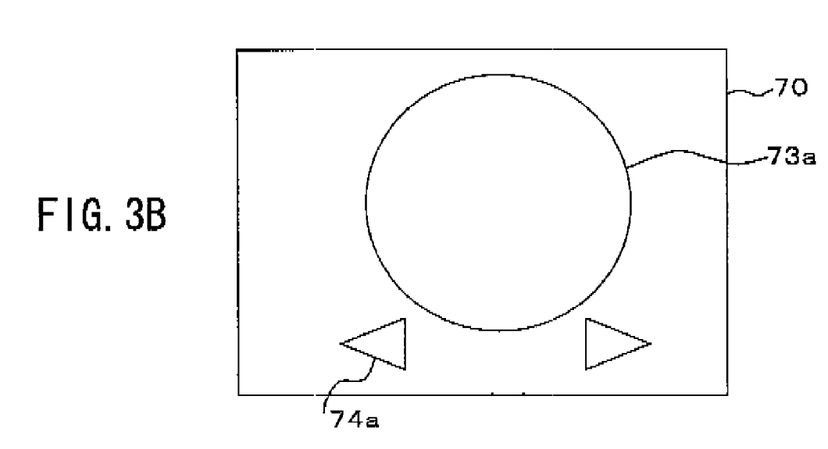
Figure 3C:
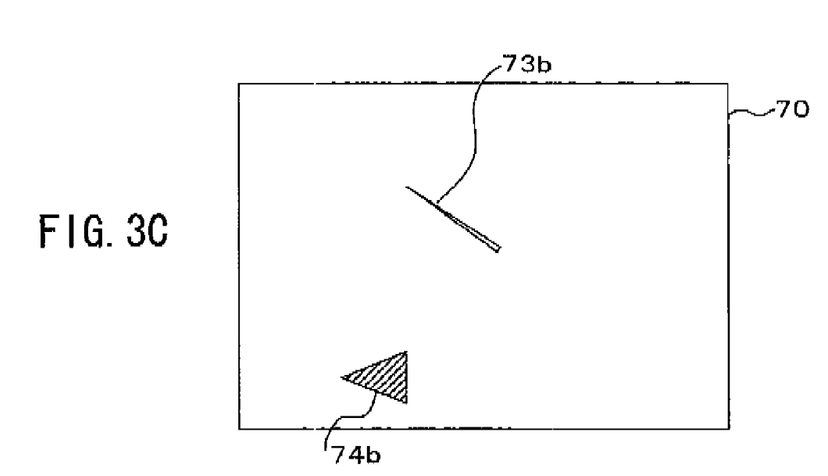

Among these component images, the fixed component images are shown in FIG. 3(b) and the variable component images are shown in FIG. 3(c). Namely, the speedometer component image 73 is composed of a fixed component image 73a (see FIG. 3(b)) representing the dial face portion, and a variable component image 73b (see FIG. 3(c)) representing the hand portion of the meter. Moreover, the indicator lamp component image 74, which shows that the left-turn direction indicator is in operation, is obtained by superimposing a fixed component image 74a (see FIG. 3(b)) representing an indicator lamp in an unlit state and a variable component image 74b (see FIG. 3(c)) representing an indicator lamp in a lit state.

In the DPF-ECU 20, the DPF controller 21 acquires the status information $D_1$ to $D_4$ with a predetermined periodicity from the ECUs 30, 40 . . . located in the various sections of the motor vehicle. When the DPF controller 21 acquires the status information $D_1$ to $D_4$ from the ECUs 30, 40 . . . , it refers to the identifier table 23 and extracts the MEN and SENs that match the acquired status information $D_1$ to $D_4$.

Here, it is assumed that the DPF controller 21 acquires the travelling speed (Km/h) as the status information $D_1$ from ECU 30, the engine rotational speed (rpm) as the status information $D_2$ from ECU 40, the gear position (P, R, N, D, 2, and L etc.) as the status information $D_3$ from ECU 50, and the status (L, R, N) of the direction indicators as the status information $D_4$ from ECU 60. It should be noted that the gear positions P, R, N, D, 2, and L respectively indicate parking mode, reverse mode, neutral, drive mode, second gear, and low gear. In addition, L, R, and N, which describe the status of the direction indicator, respectively refer to a left-turn instruction, a right-turn instruction, and no instructions.

Figure 4:
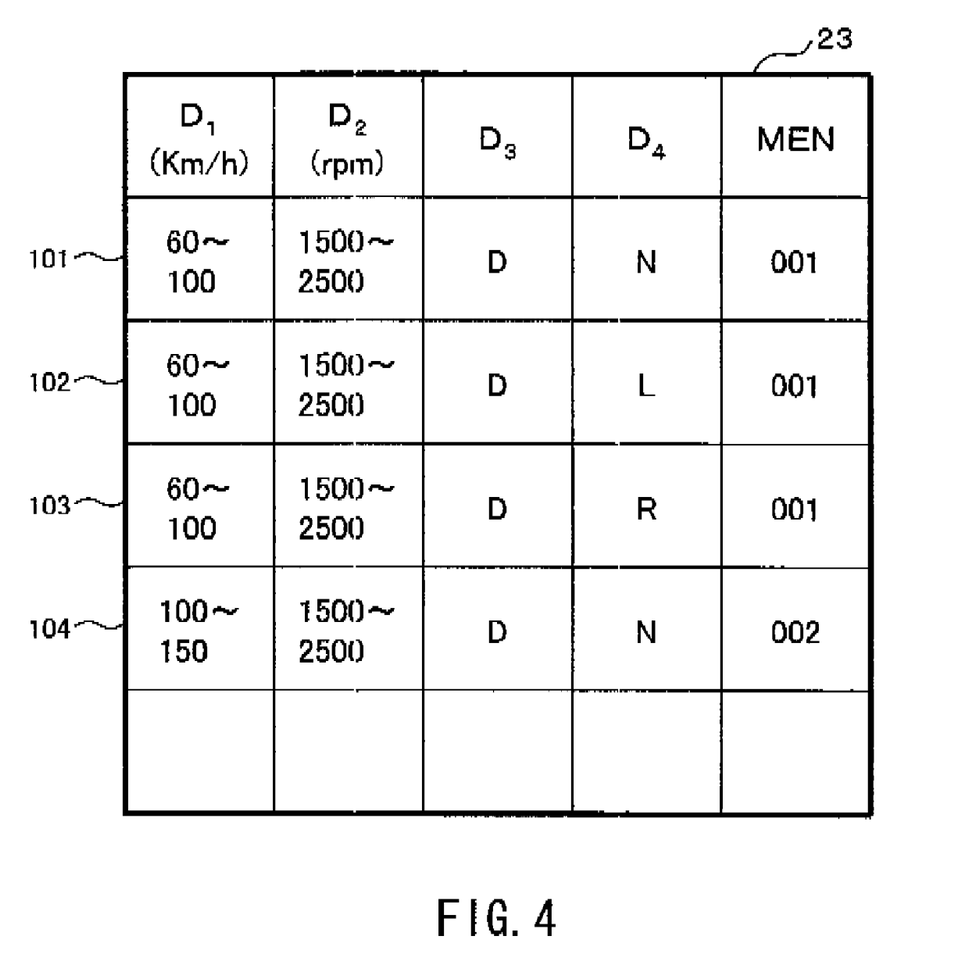
FIG. 4 is an explanatory diagram illustrating an example of the contents of the identifier table.

In the above-described case, the identifier table 23 has, for example, the contents illustrated in FIG. 4. The contents of the identifier table 23 illustrated in FIG. 4 are, however, merely an example, and the correspondence between the status information and the MEN can be set in an arbitrary fashion in a table used by the steerable vehicle information display system one intends to reduce to practice.

In the identifier table 23 illustrated in FIG. 4, the MEN is set to "001" when the contents of the status information $D_1$ to $D_4$ acquired by the DPF controller 21 match the conditions listed in lines 101 to 103. Here, the status information $D_1$ to $D_3$ has the same conditions listed in lines 101 to 103, and only status information $D_4$, which represents the status of the direction indicator, has different contents. Namely, when the status information $D_1$ to $D_4$ matches lines 101 to 103, only the display status of the indicator lamp of the direction indicator is different, which is why the same layout is used as the basic layout. On the other hand, when the contents of the status information $D_1$ to $D_4$ match line 104, a basic layout (MEN="002") is used, in which, for instance, the speedometer is displayed so as to appear larger than usual in order to make it stand out, alerting the driver to the travelling speed.

As described above, the MEN, which is used to identify a basic layout, is determined based on a combination of all the status information items. By contrast, in case of the SENs, individual identifiers ($SEN_1$ to $SEN_4$) are determined based on the respective status information items $D_1$ to $D_4$ in accordance with rules different from the one used for the MEN. For instance, $SEN_1$ with different numbers are determined based on the status information $D_1$ for each 1 Km/h of speed between "0 Km/h" and the maximum speed. Moreover, $SEN_2$ with different numbers are determined in connection with the status information $D_2$ for each 100 rpm of rotational speed between "0 rpm" and the maximum rotational speed. Furthermore, $SEN_3$ with different numbers are determined in connection with the status information $D_3$ for each respective gear position (P, R, N, D, 2, L, etc.). Moreover, $SEN_4$ with different numbers are determined in connection with the status information $D_4$ for each operational status of the direction indicator (L, R, N).

The MEN and $SEN_1$ to $SEN_4$ determined in the above-described manner are forwarded by the DPF controller 21 to the rendering controller 22. The rendering controller 22 refers to the command table 25 using the respective MEN and $SEN_1$ to $SEN_4$ as an index. Command groups of multiple types are pre-registered in the command table 25. Each of these command groups is uniquely associated with values assumed by the MEN and $SEN_1$ to $SEN_4$. In other words, command groups used to generate a basic layout image (fixed component images) are associated with each value assumed by the MEN. Moreover, command groups used to generate variable component images are associated with each value assumed by the $SEN_1$ to $SEN_4$.

The rendering controller 22 reads command groups corresponding to the respective MEN and $SEN_1$ to $SEN_4$ from the command table 24 and executes them. When the rendering controller 22 executes a command group corresponding to the MEN, a basic layout image (fixed component images) is generated in the above-described manner. In addition, the rendering controller 22 executes the respective command groups corresponding to each the $SEN_1$ to $SEN_4$, thereby generating multiple variable component images. It should be noted that each one of the fixed component images and multiple variable component images is generated on multiple mutually different layers used to create an overlay image. Subsequently, a composite image combining the fixed component images and multiple variable component images is generated by superimposing these multiple layers and displayed on the liquid crystal display device 11.

The command groups listed in the command table 25 are created and registered in advance so as to implement displays suited to the status of the various sections of the motor vehicle. Examples of these commands include a command to read out the data (bitmap data) of a component image from the image memory 26, a command specifying the size and display position of a component image, a command used to enlarge or shrink a component image, a command specifying the angle of rotation of a component image, a command used to transfer images to the various layers of the overlay image, etc.

As described above, the DPF-ECU 20 of the present embodiment allows for a composite image of a motor vehicle dashboard corresponding to the status of the various sections of the motor vehicle to be generated and displayed on the liquid crystal display device 11.

It should be noted that the steerable vehicle information display system according to the present embodiment sequentially stores the MEN and $SEN_1$ to $SEN_4$ determined by the DPF controller 21 from the identifier table 23 in the nonvolatile memory 24. Subsequently, in case of a momentary power interruption, the DPF controller 21 reads out the latest MEN and $SEN_1$ to $SEN_4$ stored in the nonvolatile memory 24 and provides them to the rendering controller 22 to effect image display. As a result, image display is not disrupted even if a momentary power interruption occurs.

The operation of the steerable vehicle information display system according to the present embodiment will be explained below with reference to the flow chart of FIG. 5.

Figure 5:
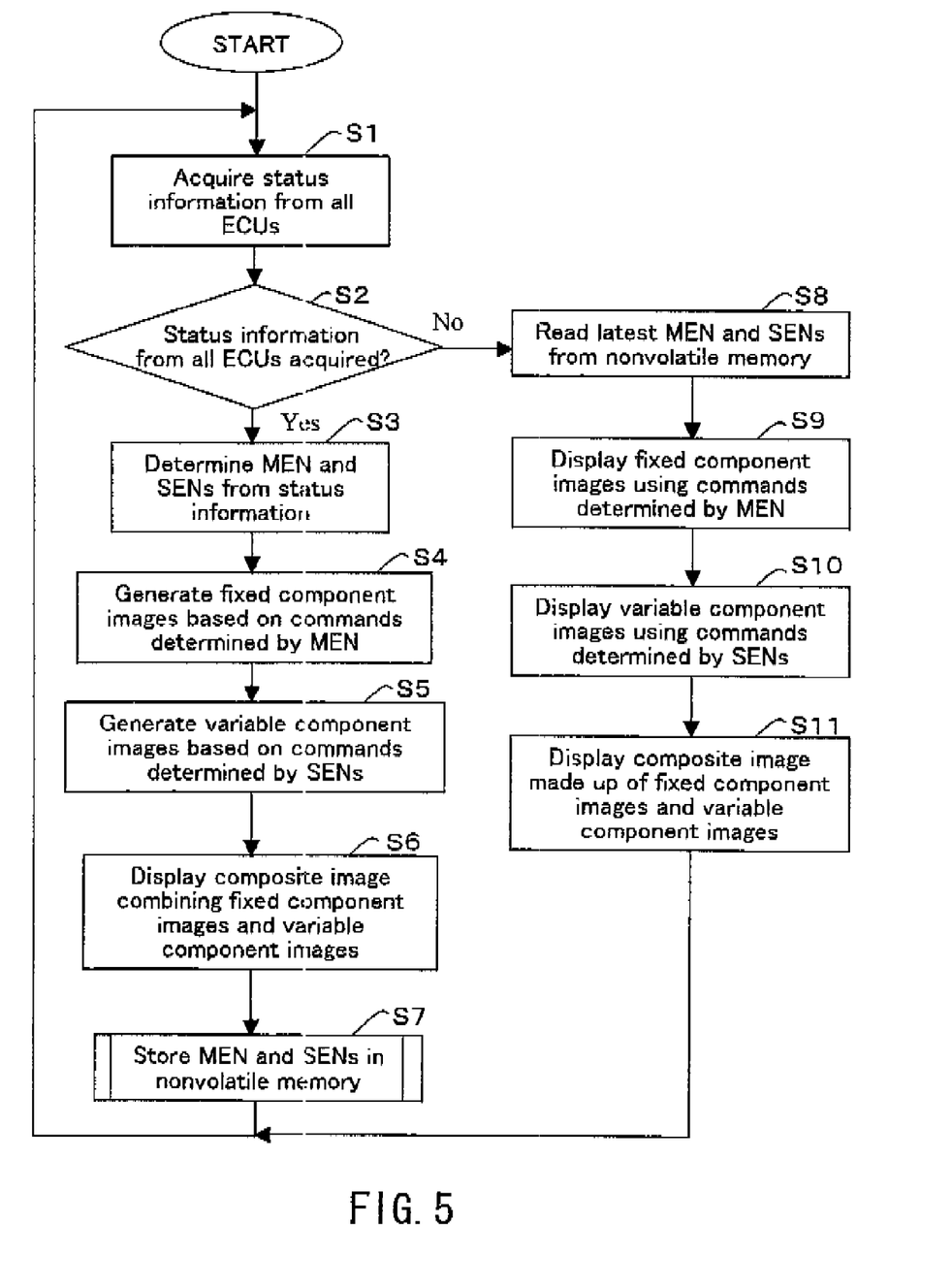
FIG. 5 is a flow chart illustrating the operation of the steerable vehicle information display system according to the present embodiment.

As shown in FIG. 5, first of all, the DPF controller 21 acquires the status information $D_1$ to $D_4$ from the ECUs 30, 40 . . . in each section of the motor vehicle (S1). Next, the DPF controller 21 checks whether status information has been acquired from all the ECUs subject to status information acquisition (S2).

If the result of confirmation obtained in Step S2 is "Yes", the DPF controller 21 determines the MEN and $SEN_1$ to $SEN_4$ from the identifier table 23 based on the status information acquired in Step S1 (S3). The DPF controller 21 forwards the determined MEN and $SEN_1$ to $SEN_4$ to the rendering controller 22. Next, the rendering controller 22 generates fixed component images for the basic layout etc. using a command group extracted from the command table 25 based on the MEN determined in Step S3 (S4).

It should be noted that it is preferable to use a configuration, in which the fixed component images generated each time Step S4 is executed are stored in a work memory (not shown) m the DPF-ECU 20, and, as long as the value of the MEN has not been updated, when Step S4 is executed the next time, the fixed component images are read out from the work memory and used. Such a configuration makes it possible to shorten the time required for image generation.

In addition, the rendering controller 22 generates variable component images using command groups extracted from the command table 25 based on the $SEN_1$ to $SEN_4$ determined in Step S3 (S5). The rendering controller 22 then generates a composite image by combining the fixed component images generated in Step S4 and variable component images generated in Step S5 and forwards it to the liquid crystal display device 11 for display (S6).

Next, the DPF controller 21 stores the MEN and $SEN_1$ to $SEN_4$ determined in S3 in the nonvolatile memory 24 (S7). The processing of Step S7 will be explained in detail below.

On the other hand, if the result of confirmation obtained in Step S2 is "No", in other words, if no status information has been acquired from one of the ECUs in Step S1, the DPF controller 21 reads out the latest MEN and $SEN_1$ to $SEN_4$ stored in the nonvolatile memory 24 (S8). The DPF controller 21 forwards the read MEN and $SEN_1$ to $SEN_4$ to the rendering controller 22.

The rendering controller 22 generates fixed component images using a command group extracted from the command table 25 based on the MEN read in Step S8 (S9). In addition, the rendering controller 22 generates variable component images using command groups extracted from the command table 25 based on the $SEN_1$ to $SEN_4$ read in Step S8 (S10). The rendering controller 22 then generates a composite image by combining the fixed component images generated in Step S9 and variable component images generated in Step S10 and forwards it to the liquid crystal display device 11 for display (S11).

As a result of the above-described process, even if status information cannot be acquired from some of the ECUs as a result of a momentary power interruption caused by a drop in the battery voltage of the motor vehicle in the motor vehicle information display system according to the present embodiment, the latest identifiers stored m the nonvolatile memory 24 are read out and used for image generation. As a result, the image of the liquid crystal display device 11 remains undisturbed even if a momentary power interruption occurs.

The processing of Step S7 of FIG. 5 will be now explained in detail with reference to FIG. 6 and FIG. 7.

Figure 6:
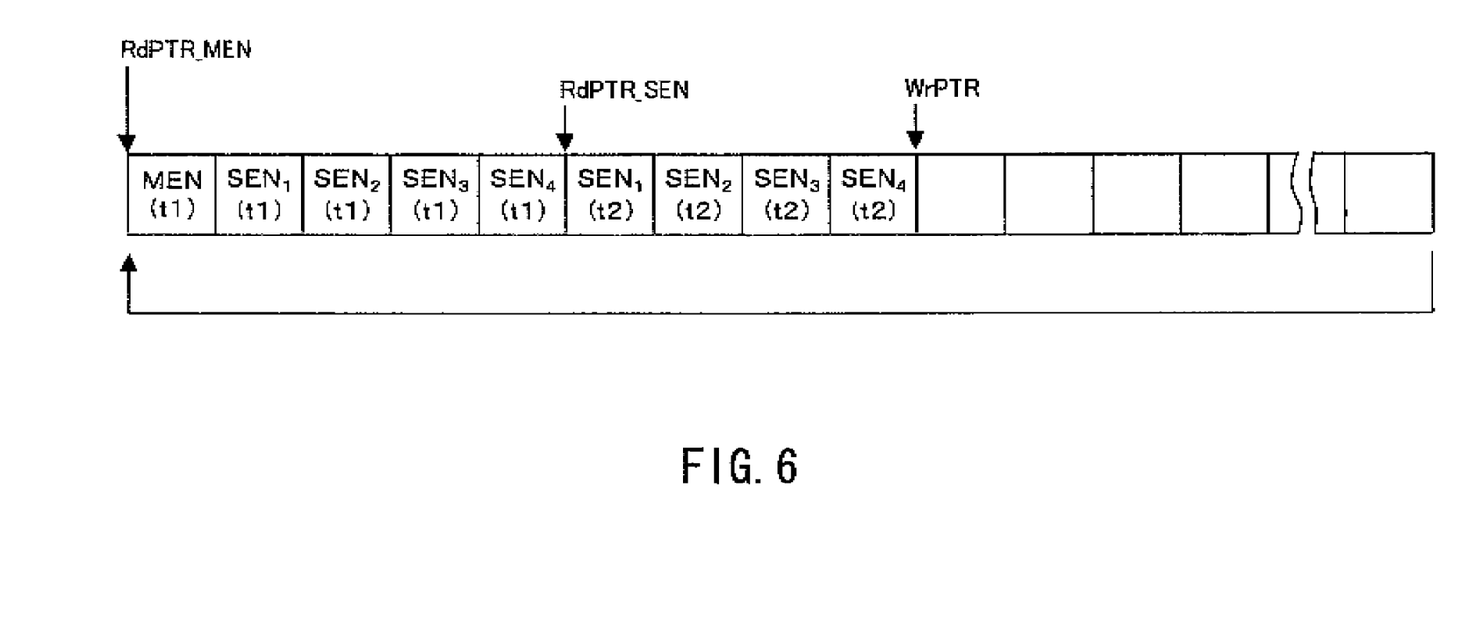
FIG. 6 is an explanatory diagram schematically illustrating the configuration of a nonvolatile memory.

FIG. 6 schematically illustrates the configuration of the nonvolatile memory 24. As shown in FIG. 6, the nonvolatile memory 24 has the so-called ring buffer structure, in which data is written successively starting from the starting address and, when data writing is complete at the final address, the process goes back to the starting address and the writing of data is continued.

Moreover, the nonvolatile memory 24 has a MEN readout pointer RdPTR#MEN, which points at a read start address used when there is a MEN read command, a SEN readout pointer RdPTR#SEN, which points at a read start address used when there is a SEN read command, and a write pointer WrPTR, which points at a write start address used when there is a write command.

As described above, while the MEN does not frequently change because it is an identifier identifying a basic layout, the SENs are subject to successive changes. Accordingly, the DPF controller 21 writes only the $SEN_1$ to $SEN_4$ to the nonvolatile memory 24 when changes occur m the SENs alone, and writes both the MEN and $SEN_1$ to $SEN_4$ when the MEN changes.

In the example shown in FIG. 6, the symbols t1, t2, which are shown both for the MEN and SENs in parentheses, represent points in time, at which the respective data are acquired by the DPF controller 21. In the example shown in FIG. 6. the MEN(t2), which is acquired at time t2 after writing the MEN (t1) and $SEN_1$(t1) to $SEN_4$(t1) respectively acquired at time t1, has the same value as MEN(t1), as a result of which only the $SEN_1$(t2) to $SEN_4$(t2) acquired at time t2 are written to the nonvolatile memory 24. Consequently, in FIG. 6, the MEN readout pointer RdPTR#MEN points at the start address of the MEN(t1) and the SEN readout pointer RdPTR#SEN points at the start address of the $SEN_1$(t2) to $SEN_4$(t2).

Figure 7:
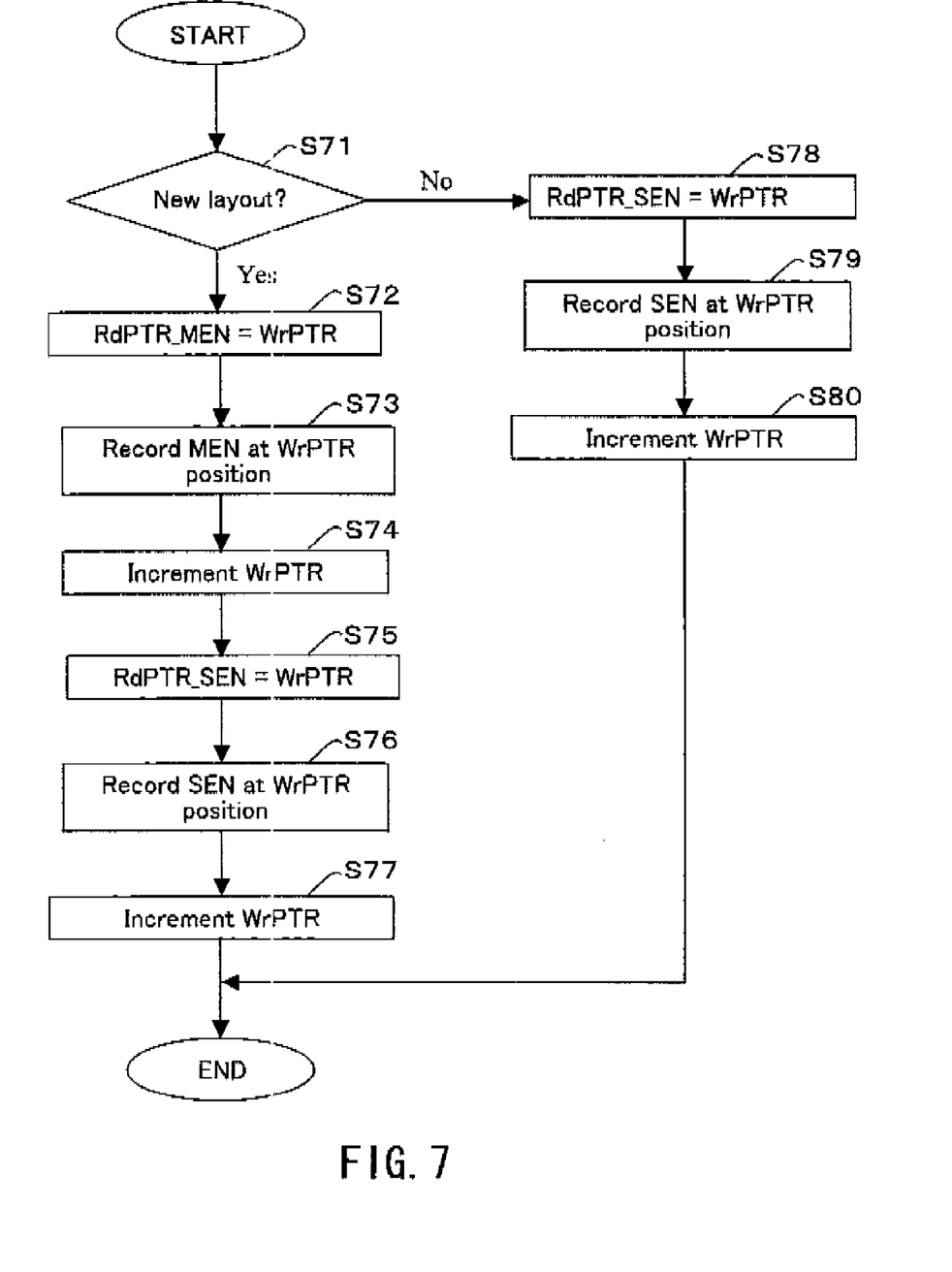
FIG. 7 is a flow chart illustrating the procedure used for MEN and SEN write operations in the nonvolatile memory.

FIG. 7 is a flow chart illustrating the procedure of MEN and SEN write operations in the nonvolatile memory 24.

First of all, the DPF controller 21 determines whether the MEN determined in Step S3 of FIG. 5 specifies a new basic layout different from the basic layout used up till now (S71). This determination is carried out, for instance, by comparing the value stored in the address pointed at by the MEN readout pointer RdPTR#MEN with the MEN determined in Step S3.

If the result obtained in Step S71 is "Yes", the MEN readout pointer RdPTR#MEN is made to coincide with the write pointer WrPTR in order to invalidate the MEN and all the SENs already stored in the nonvolatile memory 24 (S72). Next, the MEN determined in Step S3 is written to the address pointed at by the write pointer WrPTR (S73). The write pointer WrPTR is then incremented. In other words, the write pointer WrPTR is made to point at the address immediately following the region written to in Step S72 (S74).

Next, the SEN readout pointer RdPTR#SEN is made to coincide with the write pointer WrPTR (S75). The $SEN_1$ to $SEN_4$ determined in Step S3 are written to the address pointed at by the write pointer WrPTR (S76). The write pointer WrPTR is incremented and made to point at the address immediately following the region written to in Step S76 (S77). As a result, the SEN readout pointer RdPTR#SEN starts pointing at the start address of the SEN written in Step S76.

On the other hand, if the result obtained in Step S71 is "No", there is no need to update the MEN because there are no changes in the basic layout. Accordingly, first of all, the SEN readout pointer RdPTR#SEN is made to coincide with the write pointer WrPTR (S78). Next, the SEN determined in Step S3 is written to the address pointed at by the write pointer WrPTR (S79). The write pointer WrPTR is then further incremented (S80).

Based on the above described process, whenever Step S7 is executed, the latest MEN and $SEN_1$ to $SEN_4$ are stored in the nonvolatile memory 24. Then, in case of a momentary power interruption, the latest MEN can be read out from the address pointed at by the MEN readout pointer RdPTR#MEN and the latest $SEN_1$ to $SEN_4$ can be read out from the address pointed at by the SEN readout pointer RdPTR#SEN.

As described above, the motor vehicle information display system according to the present embodiment permits prevention of image disturbance due to momentary power interruptions by generating the image by reading the latest identifiers stored in the nonvolatile memory 24 when a momentary power interruption occurs.

It should be noted that the embodiment described above illustrates a specific example of how the present invention can be implemented and allows for various modifications. A few major modified embodiments are shown below.

Modified Embodiment 1

Although in the above-described embodiment the image was generated using the MEN and SENs read from the nonvolatile memory 24 when it was impossible to acquire status information from one of the ECUs, instead of that, it is also possible to use the status information that could be acquired to determine the SENs and replace only the MEN and SENs corresponding to the status information that could not be acquired with values read from the nonvolatile memory 24. For instance, if it is assumed that only the status information $D_1$ of the ECU 30 could not be acquired, then the $SEN_2$ to $SEN_4$ may be determined from the acquired status information $D_2$ to $D_4$ according to a predetermined rule. The MEN and $SEN_1$ read from the nonvolatile memory 24 can then be used as the MEN and the $SEN_1$ corresponding to $D_1$ that could not be acquired. As a result, even if a momentary power interruption occurs, a display that reflects the acquired status information as much as possible can still be obtained.

Furthermore, when a new MEN value can be estimated from the value of the SENs read from the nonvolatile memory 24 and the acquired status information in accordance with a certain rule, the MEN can be updated based on the estimation results.

Modified Embodiment 2

Although in the above-described embodiment it was assumed that the MEN and SENs were stored in the nonvolatile memory 24, the status information $D_1$ to $D_4$ acquired from the ECUs 30, 40 . . . can also be stored in the nonvolatile memory 24 along with the MEN and SENs, or alternatively, instead of them. In such a case, if it is assumed that, for instance, only the status information $D_1$ of the ECU 30 could not be acquired, the MEN and SENs can be determined using the acquired status information $D_2$ to $D_4$ and status information $D_1$ read from the nonvolatile memory 24.

Modified Embodiment 3

Although in the above-described embodiment it was assumed that only the SENs were to be updated if there were no changes in the MEN in the nonvolatile memory 24, both the MEN and the SENs may be updated every time. In this case, a single readout painter m the nonvolatile memory 24 is sufficient.

Modified Embodiment 4

The above-described embodiment utilized a configuration, in which the DPP controller 21 determined the MEN and SENs from the status information $D_1$ to $D_4$ and supplied the MEN and $SEN_1$ to $SEN_4$ to the rendering controller 22. However, the DPF controller 21 may be adapted to supply the status information $D_1$ to $D_4$ as it is to the rendering controller 22. In such a case, it would be sufficient for the rendering controller 22 to determine the commands to be executed using a table etc. establishing correspondence between the combinations of the status information $D_1$ to $D_4$ and command groups used for image generation.

In this modified embodiment, the identifier table 23 illustrated in FIG. 1 is not required. In addition, this modified embodiment can be combined with the above-described Modified Embodiment 2.

Modified Embodiment 5

Although the above-described embodiments utilized a liquid crystal display device, the scope of the present invention is not limited to information display systems utilizing Liquid crystal display devices. Any display can be used so long as at least the location used to display composite images corresponding to status information is a dot-matrix type display device.

In addition, the scope of the present invention is not limited to information display devices incorporated into instrument panels, such as the one described above. For instance, this may be an information display system utilizing a display device of the type that projects or displays images in a window in front of the driver's seat in a steerable vehicle, or a display device of the type worn on the body of the driver.

Modified Embodiment 6

The steerable vehicle information display system according to the present invention can display not only the status of the steerable vehicle alone, but can also display it in combination with other optional images (still pictures or moving pictures), such as, for example, video images capturing scenery outside the vehicle, video images stored in a storage medium provided in the steerable vehicle, video images obtained via external communications, etc., as well as additional information, such as character information etc.

Modified Embodiment 7

In the above-described embodiments, it was assumed that the basic layout (fixed component images) and variable component images were generated separately. For instance, in case of a speedometer, it was assumed that the dial face portion was generated as a fixed component image and the hand portion was generated as a variable component image. However, in the present invention, it is not essential to classify the component images into fixed component images and variable component images and all the component images may be handled as variable component images.

Modified Embodiment 8

According to the above-described embodiments, when a momentary power interruption occurs, display can be continued using the MEN and SENs stored in the nonvolatile memory 24. However, if the battery voltage drop continues for an extended period of time, it is preferable to use a configuration, in which a message that warn of malfunction in the contents displayed by the liquid crystal display device 11 is outputted to the display of the liquid crystal display device 11 or outputted in audio form.

This can be done by initiating the process of outputting the above-described warning message if, for instance, a "No" state in Step S2 of FIG. 5 arises a predetermined number of times.

INDUSTRIAL APPLICABILITY

The present invention can be utilized as a steerable vehicle information display system, in which images remain undisturbed even in case of a momentary power interruption, and as a cockpit module and a steerable vehicle incorporating the same.

The invention claimed is:

1. A steerable vehicle information display system presenting a driver of a steerable vehicle with an informational image representative of the status of the steerable vehicle, comprising:
    a status information acquisition unit that acquires status information indicative of the status of each component of the steerable vehicle respectively from each component with a predetermined periodicity;
    an image-generating unit that generates component images respectively representative of the status of each component of the steerable vehicle based on the status information acquired by the status information acquisition unit and generates the informational image by compositing the generated component images;
    a dot-matrix type display device for displaying the informational image generated by the image-generating unit; and
    a storage unit that stores information, which is the status information or intermediate information generated from the status information used to generate the informational images in the image-generating unit, and which is at least the latest information,
    wherein whenever any part of the status information supposed to be acquired in the status information acquisition unit is not acquired, the image-generating unit generates the informational image using the status information or intermediate information stored in the storage unit and displays it on the display device.

2. The steerable vehicle information display system according to claim 1,
    wherein the component images comprise both fixed component images, which represent those portions of the informational image which exhibit a relatively small amount of change over time, and variable component images, which represent those portions which exhibit a relatively large amount of change over time,
    the image-generating unit generates the fixed component images and variable component images individually based on the status information, and
    when it is determined that there are no changes in the fixed component images based on the status information or intermediate information, the image-generating unit generates the informational image by updating only the variable component images.

3. The steerable vehicle information display system according to claim 2,
    wherein the storage unit stores the status information or intermediate information used for generating the fixed component images along with the status information or intermediate information used for generating the variable component images, and
    when it is determined that there are no changes in the status information or intermediate information used for generating the fixed component images, only the status information or intermediate information used for generating the variable component images is updated and stored in the storage unit.

4. The steerable vehicle information display system according to claim 1, wherein the display device comprises a liquid crystal panel.

5. A cockpit module obtained by incorporating the steerable vehicle information display system according to claim 1 into an instrumental panel.

6. A steerable vehicle, comprising:
- a status information output unit that detects the status of each component of the steerable vehicle at each component and outputs status information representative of the detection results; and
- a steerable vehicle information display system which, based on the status information, generates, and presents a driver with, an informational image representative of the status of the steerable vehicle, wherein the steerable vehicle information display system comprises:
- a status information acquisition unit that acquires respective status information indicative of the status of each component from the status information output unit with a predetermined periodicity;
- an image-generating unit that generates component images respectively representative of the status of each component of the steerable vehicle based on the status information acquired by the status information acquisition unit and generates an informational image by compositing the generated component images;
- a dot-matrix type display device for displaying the informational image generated by the image-generating unit; and
- a storage unit that stores information, which is the status information or intermediate information generated from the status information used to generate the informational image in the image-generating unit, and which is at least the latest information, and whenever any part of the status information supposed to be acquired in the-status information acquisition unit is not acquired, the image-generating unit generates the informational image using the status information or intermediate information stored in the storage unit and displays it on the display device.

* * * * *